(12) United States Patent
Toomer et al.

(10) Patent No.: US 8,494,589 B2
(45) Date of Patent: Jul. 23, 2013

(54) SERVICE DISCOVERY VIA MOBILE IMAGING SYSTEMS AND METHODS

(75) Inventors: Christopher L. Toomer, Parker, CO (US); Steven E. Arthur, Castle Rock, CO (US)

(73) Assignee: First Data Corporation, Greenwood Village, CO (US)

( * ) Notice: Subject to any disclaimer, the term of this patent is extended or adjusted under 35 U.S.C. 154(b) by 1438 days.

(21) Appl. No.: 11/864,231

(22) Filed: Sep. 28, 2007

(65) Prior Publication Data

US 2009/0088202 A1 Apr. 2, 2009

(51) Int. Cl.
*H04M 19/04* (2006.01)
*H04N 7/15* (2006.01)

(52) U.S. Cl.
USPC .................................. 455/566; 348/14.02

(58) Field of Classification Search
USPC ........... 455/412.1, 550.1, 456.1, 558; 705/64, 705/21, 14.38, 14, 14.13, 14.12, 27.1, 14.73, 705/14.23, 14.1, 14.53, 14.59; 725/86; 283/79; 709/245; 348/14.02; 358/1.18
See application file for complete search history.

(56) References Cited

U.S. PATENT DOCUMENTS

| | | | |
|---|---|---|---|
| 2004/0014490 A1* | 1/2004 | Muramatsu et al. | 455/550.1 |
| 2004/0083170 A1 | 4/2004 | Bam et al. | |
| 2005/0009564 A1* | 1/2005 | Hayaashi et al. | 455/558 |
| 2005/0187873 A1 | 8/2005 | Labrou et al. | |
| 2005/0245271 A1* | 11/2005 | Vesuna | 455/456.1 |
| 2005/0278230 A1 | 12/2005 | Shirasaka et al. | |
| 2006/0014523 A1* | 1/2006 | Reilly | 455/412.1 |
| 2006/0155874 A1* | 7/2006 | Hunter | 709/245 |
| 2006/0178932 A1* | 8/2006 | Lang | 705/14 |
| 2006/0259361 A1 | 11/2006 | Barhydt et al. | |
| 2007/0107021 A1* | 5/2007 | Angel et al. | 725/86 |
| 2007/0159522 A1* | 7/2007 | Neven | 348/14.02 |
| 2007/0210155 A1 | 9/2007 | Swartz et al. | |
| 2007/0214049 A1 | 9/2007 | Postrel | |
| 2007/0288886 A1 | 12/2007 | Mensch et al. | |
| 2007/0291710 A1 | 12/2007 | Fadell | |
| 2008/0142599 A1 | 6/2008 | Benillouche et al. | |
| 2008/0207234 A1 | 8/2008 | Arthur et al. | |
| 2008/0208762 A1 | 8/2008 | Arthur et al. | |
| 2009/0036103 A1 | 2/2009 | Byerley et al. | |
| 2009/0088202 A1 | 4/2009 | Toomer et al. | |
| 2009/0112684 A1 | 4/2009 | Toomer et al. | |

OTHER PUBLICATIONS

PCT International Search Report and Written Opinion mailed Dec. 1, 2008, International Application No. PCT/US08/77379, 10 pages.
PCT International Search Report and Written Opinion mailed Dec. 23, 2009, International Application No. PCT/US08/80777, 7 pages.

* cited by examiner

*Primary Examiner* — Kiet Doan
(74) *Attorney, Agent, or Firm* — Kilpatrick Townsend & Stockton LLP

(57) ABSTRACT

A method of receiving content associated with media includes using a mobile device to acquire an image from media. The image has corresponding content. The method also includes using the mobile device to process the image to thereby produce the content and displaying at least a portion of the content on a display of the mobile device.

15 Claims, 5 Drawing Sheets

SERVICE DISCOVERY VIA MOBILE IMAGING SYSTEMS AND METHODS

CROSS-REFERENCES TO RELATED APPLICATIONS

This application is related to the following co-pending, commonly-assigned U.S. Patent Applications, the entirety of each of which are incorporated herein by reference for all purposes: U.S. patent application Ser. No. 11/830,409, filed on Jul. 30, 2007, entitled "MARKETING MESSAGES IN MOBILE COMMERCE"; U.S. patent application Ser. No. 11/830,336, filed on Jul. 30, 2007, entitled "MOBILE COMMUNICATION SYSTEM AND METHODS FOR REDEEMING AND REPORTING COUPONS"; and U.S. patent application Ser. No. 11/830,459, filed on Jul. 30, 2007, entitled "PAYMENTS USING A MOBILE COMMERCE DEVICE."

FIELD OF THE INVENTION

Embodiments of the present invention relate generally to mobile devices. More specifically, embodiments of the invention relate to systems and methods for using mobile devices in service discovery applications using image acquisition.

BACKGROUND OF THE INVENTION

Mobile devices have enabled interesting developments in the field of marketing. For example, advertisements may include technology that allows RF/NFC-enabled devices to acquire information from the advertisement for later use. Unfortunately, this technology is limited.

Some mobile device users, for example, are unable to use the information because their mobile devices are not equipped to read the information. And some RF/NFC-emitting advertisements are not readable by all suitably enabled devices because the advertisement and/or reader are not compatible, for technological or competitive reasons, to the detriment of the consumer. Hence, improvements are needed.

BRIEF SUMMARY OF THE INVENTION

Embodiments of the present invention provide a method of receiving content associated with media. The method includes using a mobile device to acquire an image from media. The image has corresponding content. The method also includes using the mobile device to process the image to thereby produce the content and displaying at least a portion of the content on a display of the mobile device.

In some embodiments, using a mobile device to acquire an image from media includes using a camera-enabled mobile phone to acquire an image of a portion of an advertisement. Using the mobile device to process the image to thereby produce the content may include using an application residing on the mobile device to process the image to produce the content. The software application may include optical character recognition software. The software application may include pattern recognition software. Using the mobile device to process the image to thereby produce the content may include sending the image to a server and receiving output representative of the content from the server. Using the mobile device to process the image to thereby produce the content may include using an application residing on the mobile device to produce a link to the content and using the link to direct a browser on the mobile device to a server having the content. The media may include print media such as a poster advertisement, a publication advertisement, a food label, a restaurant menu, a business card, and/or the like. The media may include electronic media such as a television commercial, an electronic billboard, a television show, a computer-generated display image, and/or the like. The content may be a 2-D bar code, a 3-D bar code, a design, a picture, a URL, an ISBN; text, and/or the like.

Other embodiments provide a computer-readable medium having computer-executable instructions thereon. The instructions are configured to configure a mobile device to capture an image, process the image to produce content, and display at least a portion of the content on the mobile device.

In some embodiments the computer-executable instructions are further configured to process the image to produce content by sending the image to a server and receiving output representative of the content from the server. The computer-executable instructions are further configured to process the image to produce content by producing a link to the content and using the link to direct a browser on the mobile device to a server having the content.

Other embodiments provide a method of receiving content associated with media. The method includes acquiring a software application programmed to configure a mobile device to acquire and process images, enabling the mobile device to acquire the images, acquiring an image from media, using the software application to process the image into content, displaying at least a portion of the content on a display associated with the mobile device, and transmitting at least a portion of the content to a point-of-sale device to thereby receive a benefit.

In some embodiments acquiring an image from media comprises using a camera-enabled mobile phone to acquire an image of a portion of an advertisement. The software application may include optical character recognition software. The software application may include pattern recognition software. Using the mobile device to process the image to thereby produce the content may include sending the image to a server and receiving output representative of the content from the server. Using the mobile device to process the image to thereby produce the content may include using an application residing on the mobile device to produce a link to the content and using the link to direct a browser on the mobile device to a server having the content. The media may include print media such as a poster advertisement, a publication advertisement, a food label, a restaurant menu, a business card, and/or the like. The media may include electronic media such as a television commercial, an electronic billboard, a television show, a computer-generated display image, and/or the like. The content may be a 2-D bar code, a 3-D bar code, a design, a picture, a URL, an ISBN; text, and/or the like.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
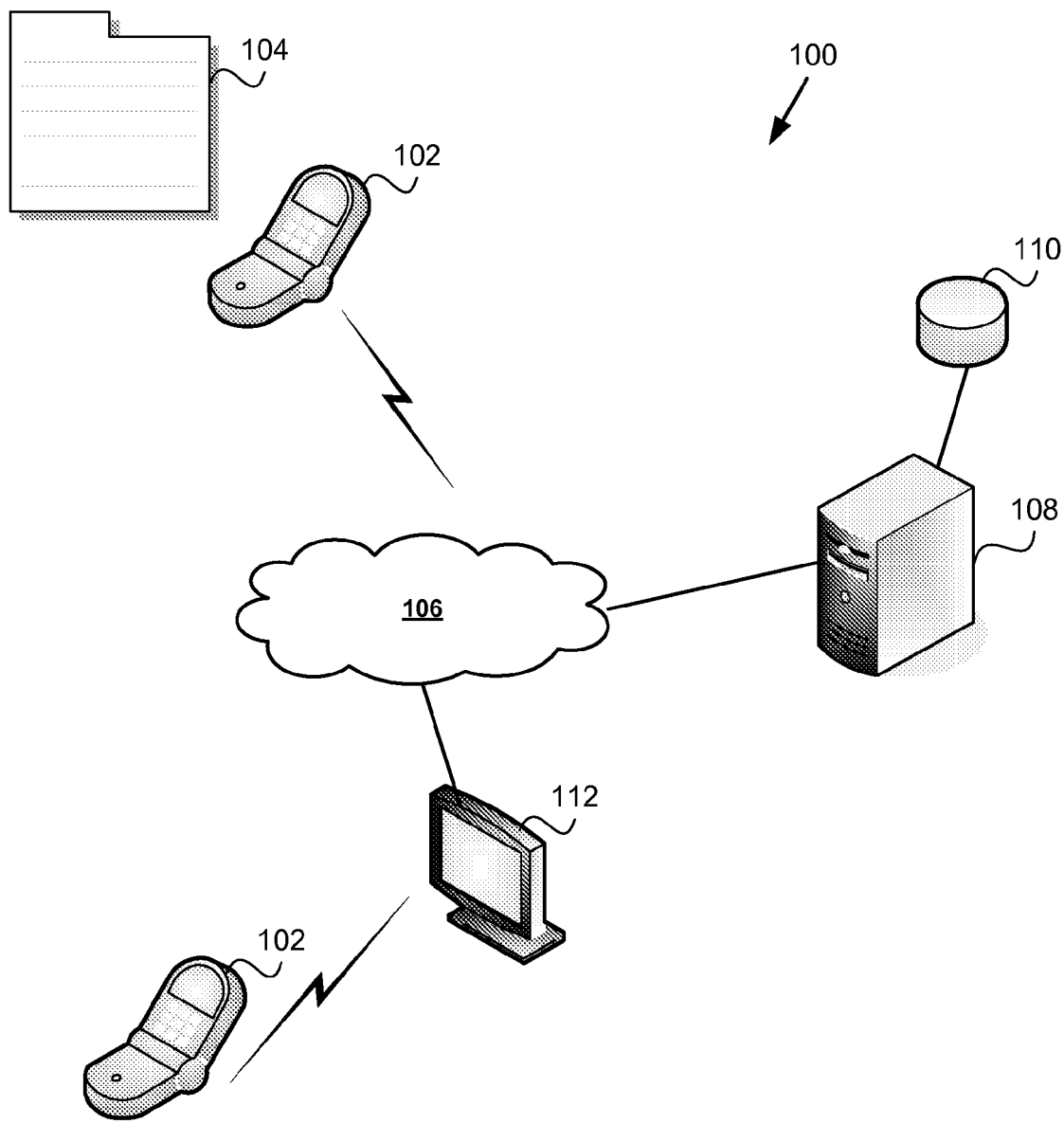
FIG. 1 illustrates an exemplary system within which embodiments of the invention may be used.

Embodiments of the present invention relate to service discovery using mobile imaging. In order to provide a context for describing embodiments of the present invention, embodiments of the invention will be described herein with reference to using camera-enabled cell phones to acquire service discovery information. Those skilled in the art will appreciate, however, that other embodiments are possible. For example, embodiments of the invention may be implemented using infrared (IR) scanning technology, video cameras, digital still cameras, and the like.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

According to embodiments of the invention, a user uses a mobile device to acquire an image having content embedded therein. The user is thereafter able to use the image in an advantageous way. Is some embodiments, the image is from print media such as advertising (posters, gift cards, newspapers, magazines, or the like), magazine or newspaper articles, product labels, restaurant menus, and/or the like. In other embodiments, the image is from electronic media, such as electronic advertising, TV commercials, and/or the like. The content may be a bar code, a picture, a design, text, a URL, and/or the like. The mobile device may be a camera-enabled cell phone, digital still camera, video camera, scanner, or the like. The device may be configured to process the image and/or transmit the image to a different location for processing and receive the results. The mobile device may be enabled to take additional action based on the results of the processing. For example, the device may be configured to transmit information using Near Field Communication (NFC) technology or the like. The information may be transmitted to a point-of-sale (POS) device or the like.

In a specific embodiment, a user uses a camera-enabled mobile phone to acquire an image of a portion of an advertisement. In some embodiments, the user executes an application on the mobile device before acquiring the image. The application then processes the image using optical character recognition (OCR), field recognition software, or the like. The application then produces output that may be used by the device.

In some embodiments, the device transmits the image to a server. The server then processes the image or locates corresponding information in a database. The result is then returned to the mobile device.

Once the mobile device is in possession of the processed content, it may display the information to the user. The content may be, for example, a coupon, an advertising announcement, a sales offer, directions to a location, etc. As stated above, the mobile device also may transmit the content, using NFC or the like, to a properly enabled receiver, such as a POS or the like.

Having described embodiments of the invention generally, attention is directed to FIG. 1, which depicts an exemplary system 100 within which embodiments of the invention may be implemented. In order to provide a context for the ensuing description, embodiments of the invention will be discussed in the context of using a mobile phone to acquire information from advertising. Those skilled in the art will appreciate, however, that the system 100 is merely exemplary of a number of possible systems within which embodiments of the invention may be implemented. The system 100 includes a mobile device 102 configured to capture images from, for example, advertising 104. The mobile device 102 may be any of a variety of image capture devices including cell phones, digital still cameras, personal digital assistants (PDAs), and the like. The captured image may include a bar code, a design, a message, an http web address, and/or the like.

The mobile device 102 may be configured to process a captured image into useful content. The content may be embedded into the captured image (e.g., bar coding), but this is not necessarily the case. For example, the mobile device 102 may be programmed to perform optical character recognition (OCR) and/or pattern recognition on the image to thereby produce the content. In some embodiments, the mobile device 102 is configured for wireless communication. If the device is so configured, the device may send the image through a network 106 to a server 108. The server 108 has memory 110 associated therewith. The server 108 may be configured to receive the image and return corresponding content. In doing so, the server may perform OCR or pattern recognition or may match the image to a stored image to thereby identify the corresponding content. The content may be returned to the mobile device vie the network 106.

The mobile device 102 also may be configured to transmit the image or the corresponding content to another device. For example, the mobile device 102 may transmit content to a point-of-sale (POS) device 112 capable of processing the content in an advantageous way for the user. Similar technology is described more fully in, for example, previously incorporated U.S. patent application Ser. No. 11/830,409 and/or previously-incorporated U.S. patent application Ser. No. 11/830,336.

Figure 2:
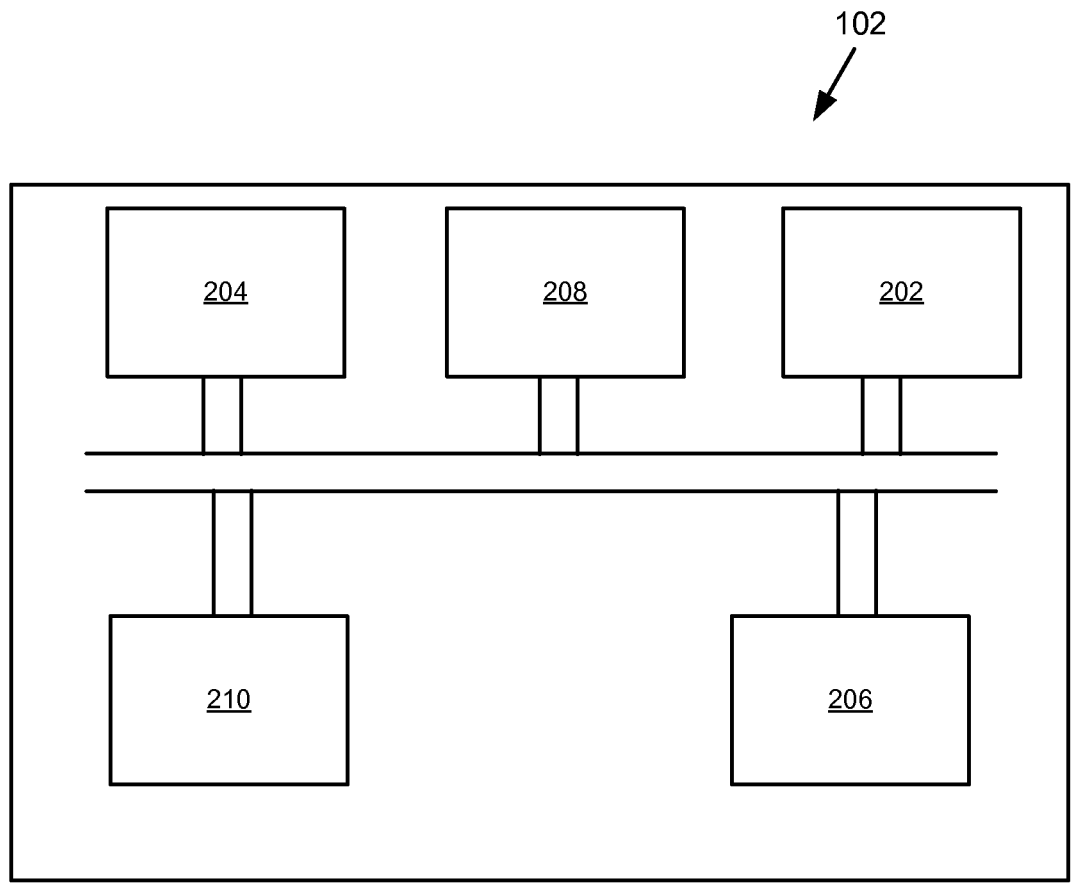
FIG. 2 illustrates a more detailed view of a mobile device which may be used according to embodiments of the invention.

FIG. 2 depicts a more detailed view of an exemplary mobile device 102. The mobile device 102 includes an image capture arrangement 202, a processor 206, a memory 204, a long range wireless receiver/transmitter 208, and a short range wireless receiver/transmitter 210 (e.g., near field communication (NFC)). In use, the device 102 may capture an image using the image capture arrangement 202, process the image into content using the processor 206, store the image and/or the content in memory 204, transmit the image or the content over a network using the long range wireless receiver/transmitter 208, and transmit the image or content over a short distance to, for example, a POS device.

In a specific example, a user enrolls into a service discovery program and installs software on his cell phone (note that in other embodiments necessary applications may be pre-installed). The user encounters an advertisement that identifies itself as being within the service discovery program, specifically providing service discovery through mobile imaging. The user uses his cell phone to capture an image of a particular design from the advertisement. The design is specifically identified to the user for this purpose. The user then transmits the image to a server. The server uses the image and pattern recognition or the like to locate a database record corresponding to the image. The record includes content that the server returns to the user's cell phone. The content in then displayed and/or stored. In this particular example, the content directs the user to a nearby coffee shop at which the user will receive a discount upon presentation of the content. The user visits the coffee shop and, upon ordering, transmits the content to a POS at the coffee shop, receiving a discount. Those skilled in the art will appreciate that the foregoing is merely exemplary of embodiments of the present invention and will recognize many other embodiments in light of this disclosure, an example of which is described in previously-incorporated U.S. patent application Ser. No. 11/830,459.

Figure 3:
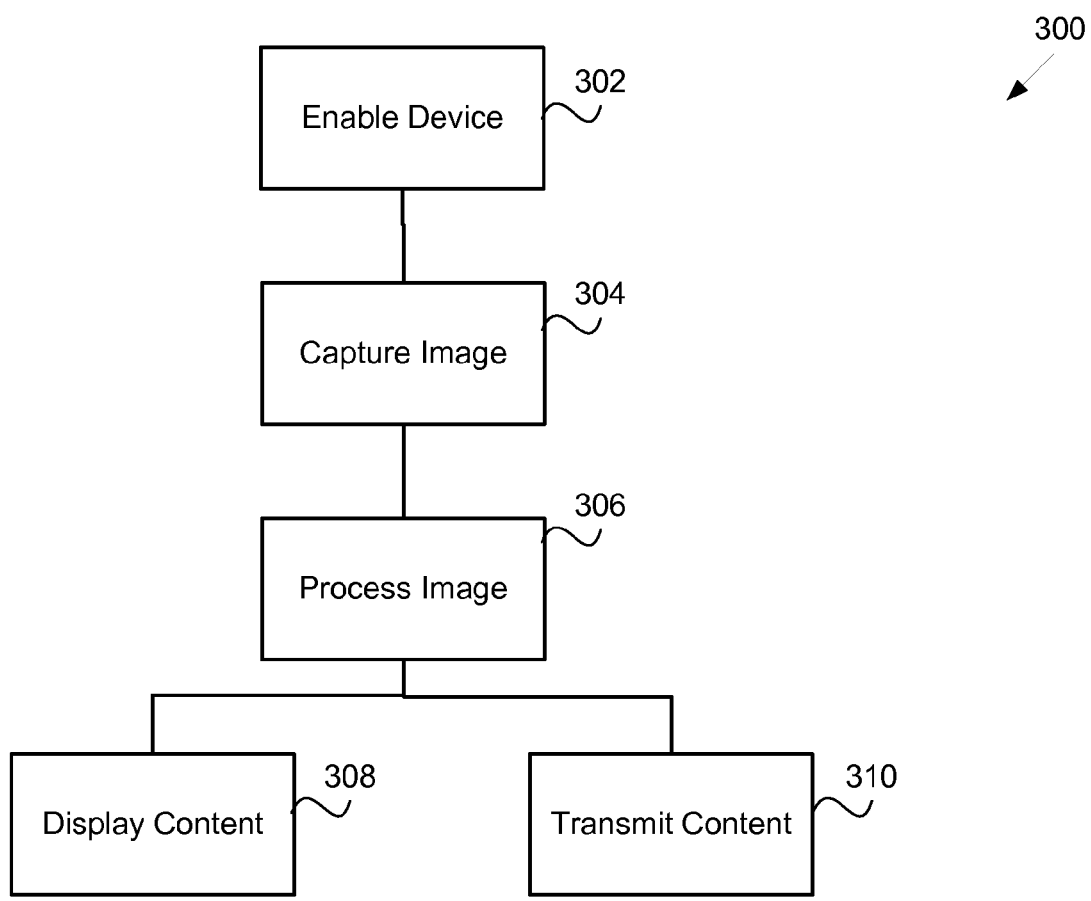
FIG. 3 depicts a service discovery method according to embodiments of the invention, which method may be implemented in the system of FIG. 1.

Having described a system and device in accordance with embodiments of the invention, attention is directed to FIG. 3, which depicts an exemplary method 300 according to embodiments of the invention. Those skilled in the art will appreciate that the method 300 is merely exemplary of a number of possible embodiments. Moreover, other examples according to other embodiments may have more, fewer, or different steps than those illustrated and described herein. Further, the blocks illustrated and described herein may be traversed in orders different than that shown. The method 300 may be implemented in the system 100 of FIG. 1 or another appropriate system.

The method 300 begins at block 302, at which location a user enables a mobile device. Enabling the mobile device may include any of a number of activities. For example, enabling the device may include downloading a software application for a particular service discovery provider, executing the application, enabling an image capture function of the device, and/or the like. In some embodiments, enabling the device may include simply powering the device on.

At block 304, the mobile device is used to capture an image. This can take many forms, but typically includes capturing an electronic image of a portion of a service discovery advertisement enabled for mobile imaging. In some embodiments, the image may include other than visual wavelengths (e.g., infrared imagery).

At block 306, the captured image is processed to access or produce content. The image may be processed by the mobile device or may be transmitted to a remote server for processing as will be described in greater detail below. At block 308, the content may be displayed on a display of the mobile device and/or the content may be transmitted to another device, a POS, or the like at block 310.

Figure 4:
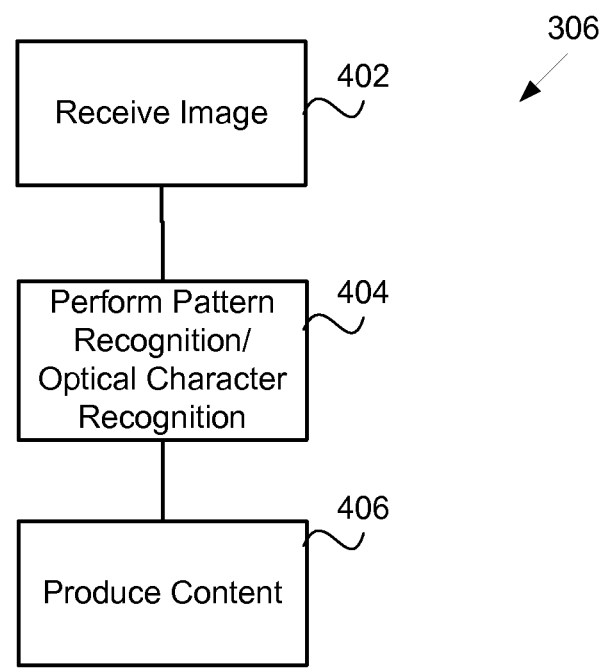
FIG. 4 depicts a method of processing a captured image into content according to embodiments of the invention, which method may be implemented in the mobile device of FIG. 2.

FIG. 4 depicts an embodiment of the image processing block 306 of FIG. 3 in greater detail. In this instance, the image processing is performed by the mobile device. A processor receives the image at block 402. Using, for example, a previously-downloaded software application, the processor performs OCR, pattern recognition, or the like at block 404. This produces content, as indicated at block 406. Other examples exist.

Figure 5:
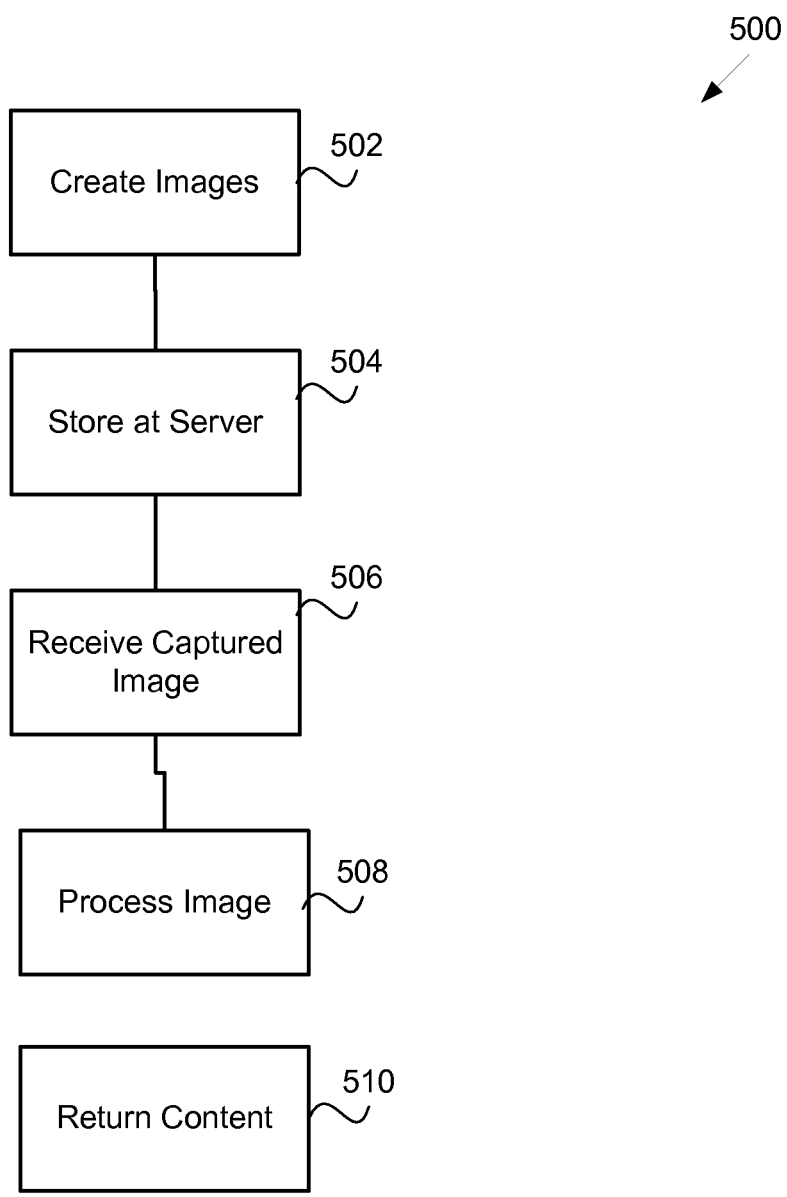
FIG. 5 depicts a method of processing a captured image into content according to embodiments of the invention, which method may be implemented in the server shown in FIG. 1.

FIG. 5 depicts another exemplary method 500 in which image processing takes place at a remote server. In this embodiment, images to be deployed on advertising are created at block 502. As stated previously, the images may have embedded information (e.g., bar code, URL, and/or the like), which may direct the user's device to the correct source for the content, or the images may simply be used to locate corresponding content on the remote server. The images (or corresponding information) are stored on a server at block 504. The images may be stored in records with corresponding content to be returned to a user upon receiving a copy of the image from the user's mobile device. Advantageously, according to this embodiment, it is possible to change the content without having to redeploy the corresponding advertising.

At block 506, a captured image is received at the server. The image is processed at block 508, which may include using OCR and/or pattern recognition, locating a corresponding image in a database, using a lookup table, redirecting a browser on the user's device to a particular web site, and/or the like. Either way, processing the image produces content, and the content is returned to the user's mobile device at block 510.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of receiving content associated with media, comprising:
    using a camera of a mobile device to acquire an image from media by taking a picture of the image using the camera, wherein the image comprises a particular design from at least a portion of an advertisement, wherein the advertisement further includes identification information that identifies to the user that the purpose of the particular design is to permit the user to receive a discount for a subsequently ordered item associated with the advertisement;
    transmitting the image to a remote computer;
    receiving at the mobile device displayable content that was obtained using the image, and
    displaying at least a portion of the content on a display of the mobile device, wherein the portion of the displayed content comprises a form of discount that may be provided at a merchant location to receive the discount; and
    transmitting from the mobile device to a point of sale device at the merchant location the discount to permit the discount to be redeemed when making the purchase;
    wherein using the mobile device to process the image to thereby produce the content comprises:
    using an application residing on the mobile device to produce a link to the content; and
    using the link to direct a browser on the mobile device to a server having the content.

2. The method of claim 1, wherein using the mobile device to process the image to thereby produce the content comprises using an application residing on the mobile device to process the image to produce the content.

3. The method of claim 2, wherein the software application comprises optical character recognition software.

4. The method of claim 2, wherein the software application comprises pattern recognition software.

5. The method of claim 1, using the mobile device to process the image to thereby produce the content comprises;
    sending the image to a server; and
    receiving output representative of the content from the server.

6. The method of claim 1, wherein the media comprises print media selected from a group consisting of:
    poster advertisement;
    publication advertisement;
    food label;
    restaurant menu; and
    business card.

7. The method of claim 1, wherein the media comprises electronic media selected from a group consisting of:
    television commercial;
    electronic billboard;
    television show; and
    computer-generated display image.

8. The method of claim 1, wherein the content comprises a selection from a group consisting of:
    2-D bar code;
    3-D bar code;
    design;
    picture;
    URL;
    ISBN; and
    text.

9. A non-transitory computer-readable medium having computer-executable instructions thereon configured to:
    configure a mobile device to capture an image~wherein the image comprises a particular design from an advertisement having identification information that identifies to the user that the purpose of the particular design is to permit the user to receive a discount for a subsequently ordered item associated with the advertisement;
    process the image to produce content, wherein the content includes the discount that may be redeemed at a point of sale device to obtain a discount on a purchased item; and
    display at least a portion of the content including the discount on the mobile device; and
    transmit the discount to the point of sale device to obtain the discount;
    wherein the computer-executable instructions are further configured to process the image to produce content by:
    producing a link to the content; and
    using the link to direct a browser on the mobile device to a server having the content.

10. The computer-readable medium of claim 9, wherein the computer-executable instructions are further configured to process the image to produce content by;
    sending the image to a server; and
    receiving output representative of the content from the server.

11. A method of receiving content associated with media, comprising:
    acquiring a software application programmed to configure a mobile device to acquire and process images~including an image of a particular design of an advertisement;
    enabling the mobile device to acquire the images;
    acquiring an image from media, wherein the image comprises the particular design from the advertisement~and wherein the advertisement includes identification information that identifies to the user that the purpose of the particular design is to permit the user to receive a discount for a subsequently ordered item associated with the advertisement;
    using the software application to process the image into content;
    displaying at least a portion of the content on a display associated with the mobile device, wherein the content comprises the discount on an item purchased from a merchant; and
    transmitting at least a portion of the content to a point-of-sale device to thereby receive a benefit from the discount;
    wherein using the mobile device to process the image to thereby produce the content comprises:
    using an application residing on the mobile device to produce a link to the content; and
    using the link to direct a browser on the mobile device to a server having the content.

12. The method of claim 11, wherein acquiring an image from media comprises using a camera-enabled mobile phone to acquire an image of a portion of an advertisement.

13. The method of claim 11, wherein the software application comprises optical character recognition software.

14. The method of claim 11, wherein the software application comprises pattern recognition software.

15. The method of claim 11, wherein the image is selected from a group consisting of:
  2-D bar code;
  3-D bar code;
  design;
  picture;
  URL;
  ISBN; and
  text.

* * * * *